March 22, 1966          R. NOUEL          3,241,191

APPARATUS FOR INJECTION MOLDING PLASTICS

Filed Feb. 8, 1962          6 Sheets-Sheet 1

March 22, 1966  R. NOUEL  3,241,191
APPARATUS FOR INJECTION MOLDING PLASTICS
Filed Feb. 8, 1962  6 Sheets-Sheet 2

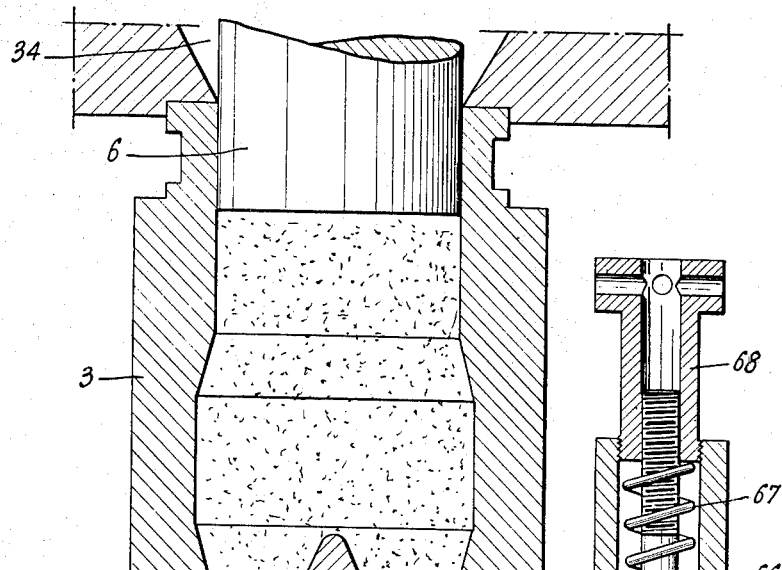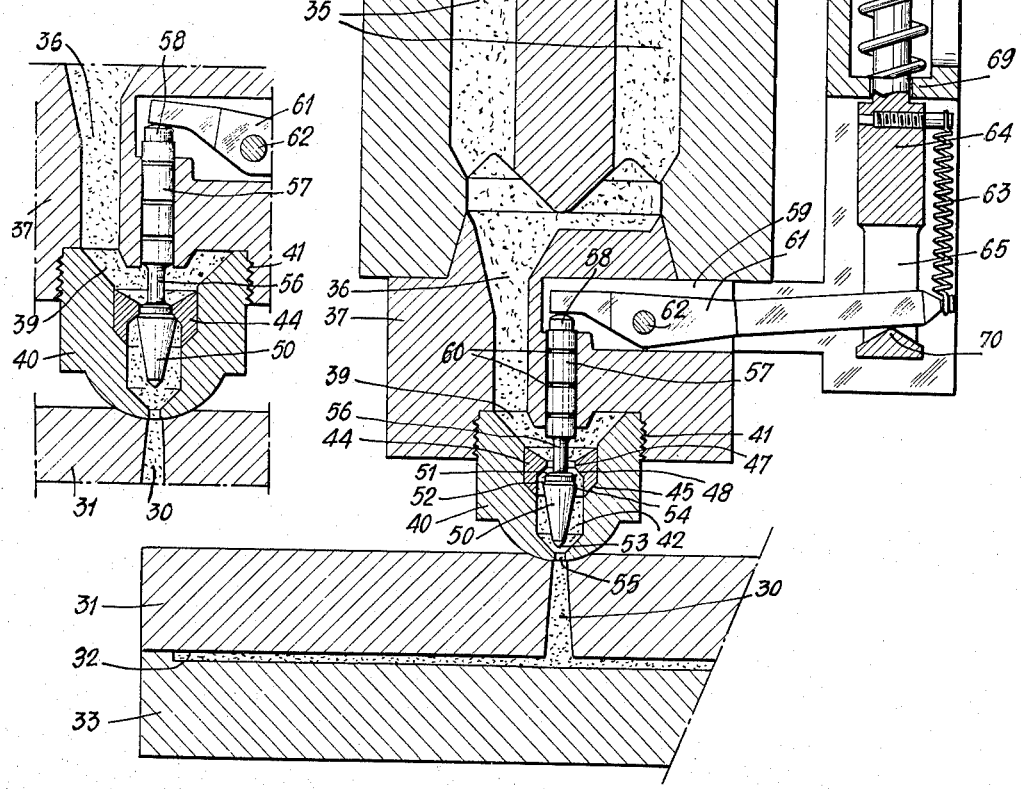

March 22, 1966 R. NOUEL 3,241,191
APPARATUS FOR INJECTION MOLDING PLASTICS
Filed Feb. 8, 1962 6 Sheets-Sheet 4

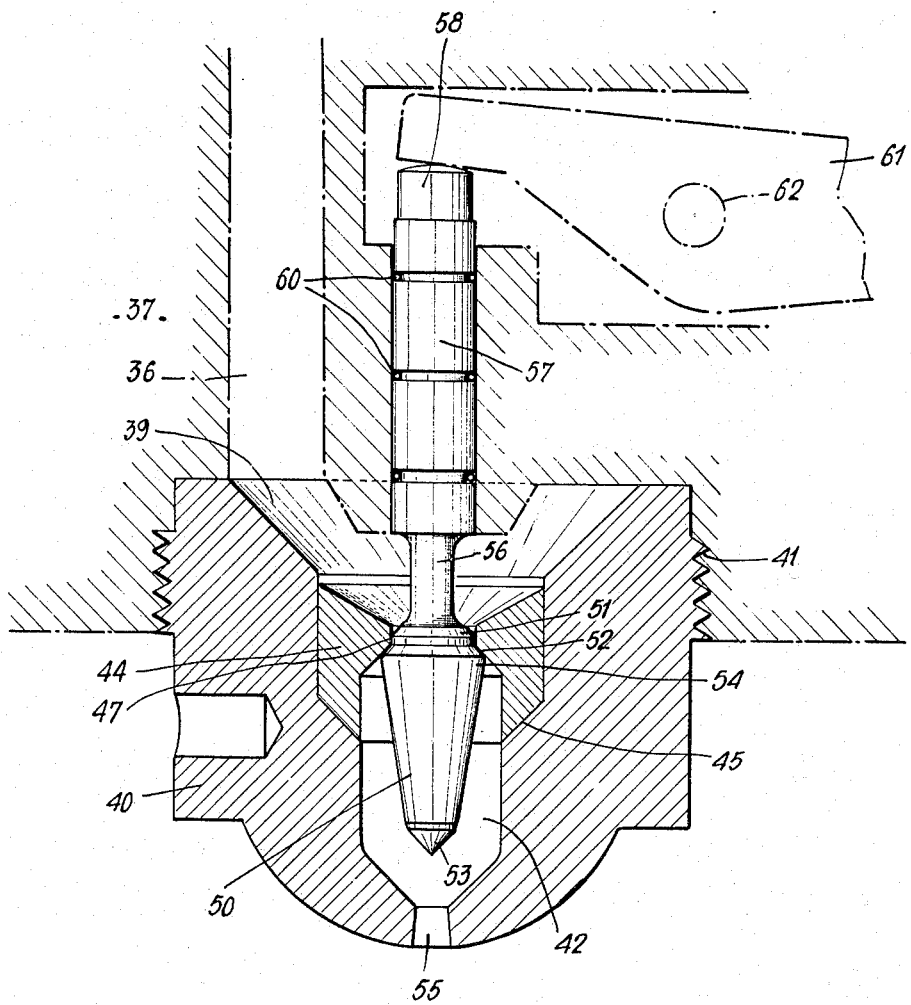

March 22, 1966  R. NOUEL  3,241,191
APPARATUS FOR INJECTION MOLDING PLASTICS
Filed Feb. 8, 1962  6 Sheets-Sheet 6
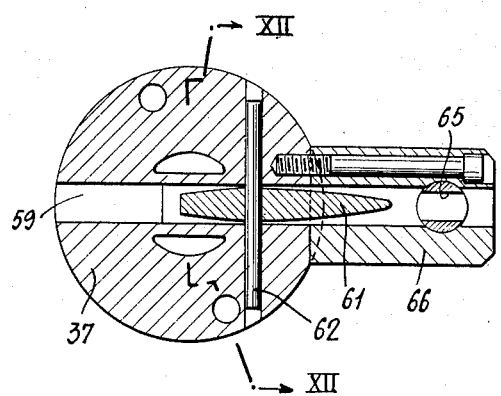
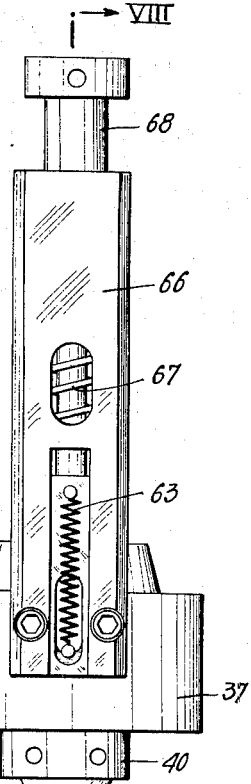
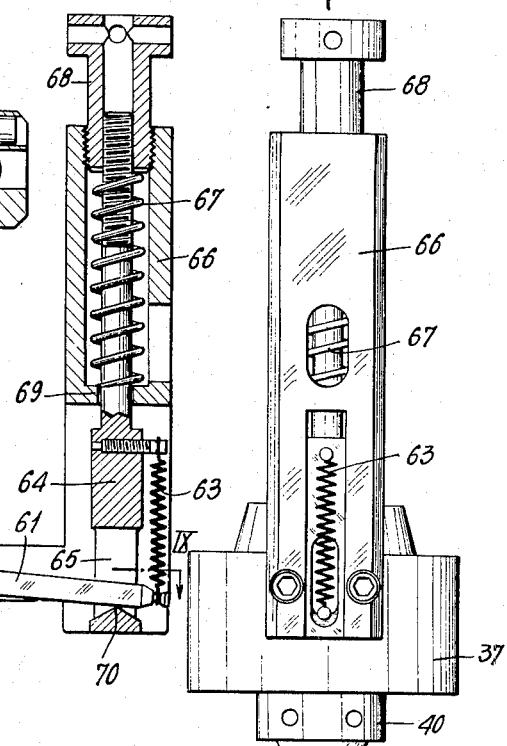
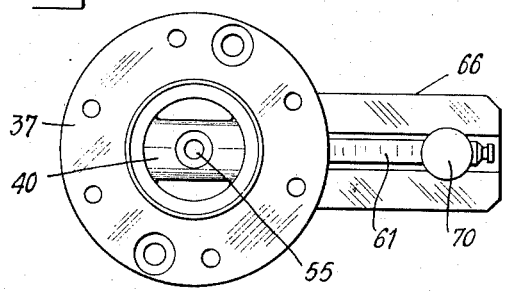
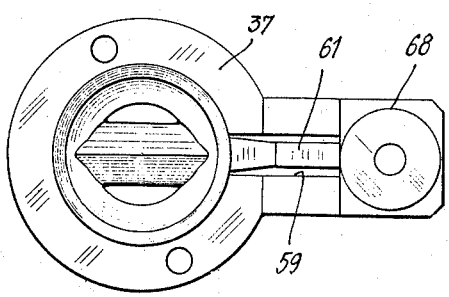
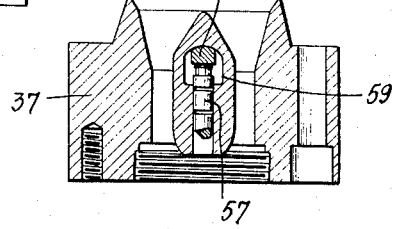

United States Patent Office 3,241,191
Patented Mar. 22, 1966

3,241,191
APPARATUS FOR INJECTION MOLDING PLASTICS
Robert Nouel, Villejuif, Seine, France, assignor, by mesne assignments, to Inventions Finance Corporation, New York, N.Y., a corporation of Delaware
Filed Feb. 8, 1962, Ser. No. 171,878
15 Claims. (Cl. 18—30)

This application is a continuation-in-part of my co-pending application 89,254, filed February 14, 1961.

This invention relates to improved apparatus for molding plastic articles, especially synthetic plastic materials such as polyamides or the like.

In my said previous application, it is disclosed that the draw rod of the first regulator slides obliquely and the second valve slides vertically. It is also taught that the said regulator has the essential object of limiting the pressure inside the mold at the end of the molding to a regulable and predetermined value, irrespective of the final value of the pressure in the transfer or injection system. It is further shown that the device for limiting the final pressure in the mold, without reducing the injection pressure, permits a rapid feeding of the mold; thus a more rapid molding cycle or tempo. In both cases, the regulation is effected by an external force: spring, pressure of air or oil, etc. with the feed and mold components maintained in exact alignment with respect to the mold cavity. This alignment is equally essential in the operation of the present invention, but in application No. 89,254 the regulator valve was balanced, whereas in the present case, it is intentionally unbalanced. Its special shape permits correct flow and a definite closing for the very fluid material for which it was designed. In addition to its special shape, a special treatment is provided around the same piston so as to be always equilibrated and centered regardless of the pressure, heat, etc.

The present valve with its pressure regulation is used on a press machine called by the trade name "Pousse tout," equivalent to an inexpensive universal thrusting type molding machine, achieving a frontal area of molded piece seven times greater than the area of the injection piston, features and sizes not obtained by any other machine of this type.

Consequently, one of the objects of the present application is to provide means for controlling and regulating the final pressure applied to the material injected into the mold cavity. Said controls and regulations being so perfected that there can be no overloading and consequently no possibility of any separation of the mold halves which might cause flash or distortion of the molded article due to this separation.

A further object of this invention is the provision of double pressure controls; one relating to an injection pressure regulation applied by an external force alone, the second relating to an injection pressure control effected by an internal automatic regulator. Said double pressure controls are to be used either separately or at the same time to insure completely correct automatic pressure regulation and highly efficient automatic operation of the entire machine, controlled by one single hydraulic distributor, especially created and designed for the purpose.

Another object of this invention is the provision of an injection chamber divided by a valve and a valve seating ring, easily removable for changing the regulation ration at will.

Another object is the provision of means for the removing of the injection chamber itself, the piston, the pot, the two platens or any part of the machine, easily and rapidly within a few minutes time.

A further object of the invention is to provide an apparatus which is adapted for molding polyamides or like materials having a short melting temperature range, so that they are in the state of highly mobile liquids during molding operations.

According to the present invention I provide an injection molding machine having an injection nozzle chamber to be connected to the mold, a pressure chamber receiving material to be molded, a valve seating between said chambers, a valve member located in said nozzle chamber, a valve piston slidable in a cylinder, one end of said piston communicating with said pressure chamber, a valve stem connecting the piston with the valve member, said stem having a smaller cross-sectional area than the piston and the piston having a smaller cross-sectional area than the valve member.

Further features of the invention will be described heerinafter and set forth in the appended claims.

Constructional forms of the invention will now be described with reference to the accompanying diagrammatic drawings wherein:

FIGURES 3, 4 and 14 are similar views showing the parts in different positions;

FIGURE 7 is an enlarged view of a part shown in FIGURES 2, 3 and 4;

FIGURE 8 shows a view similar to FIGURE 2 but with part in elevation;

FIGURE 9 is a sectional view on line 9—9 on FIGURE 8;

FIGURE 10 is a bottom plan of FIGURE 8;

FIGURE 11 is a top plan of FIGURE 8;

FIGURE 12 is a sectional view on line 12—12 on FIGURE 9; and

FIGURE 13 is a side view taken from the right of FIGURE 8, but is shown in elevation.

Figure 1:
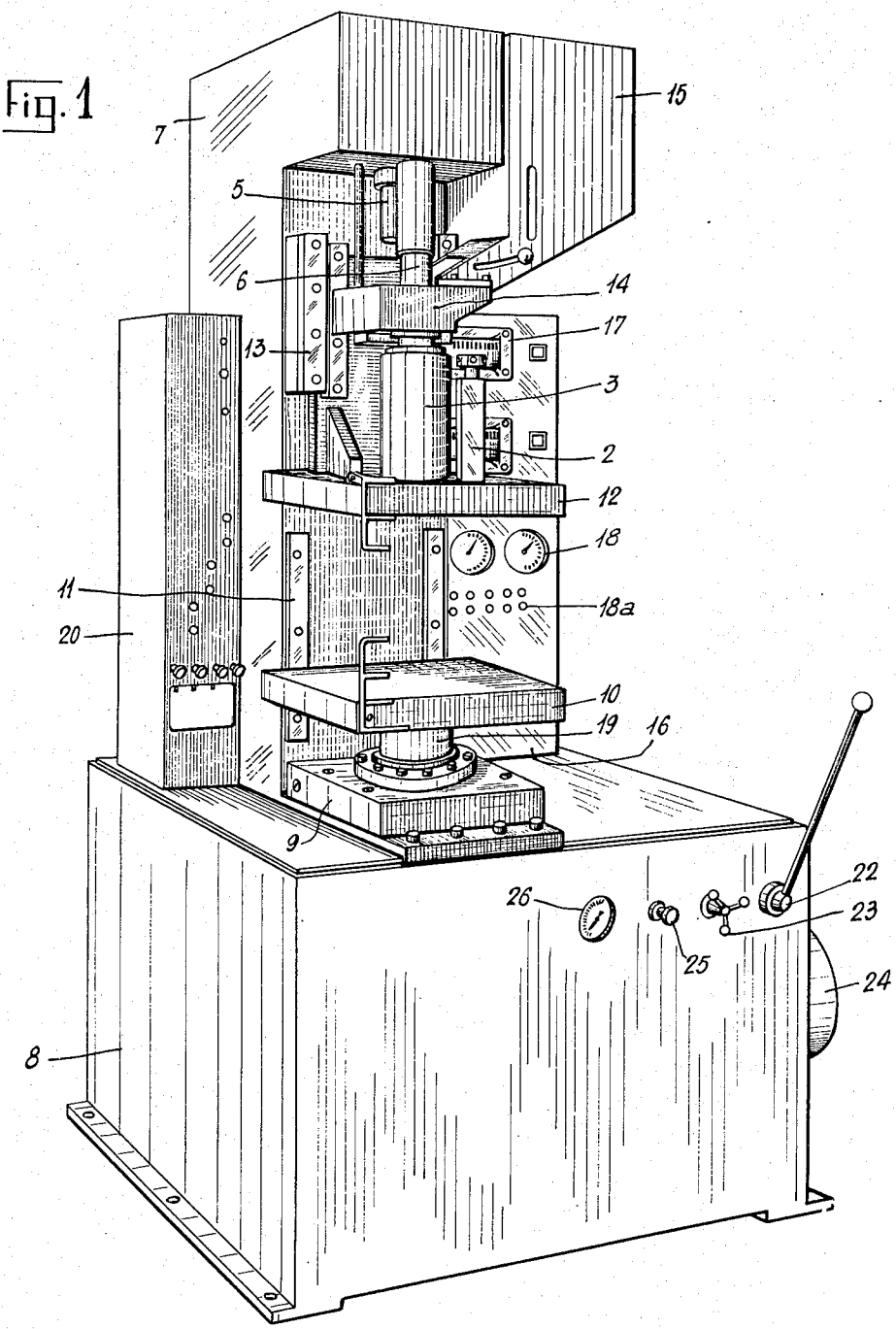
FIGURE 1 is a perspective view of an injection molding machine made in accordance with the invention.

The injection molding machine shown in FIGURE 1 has a base 8 containing an oil tank and carrying a frame 7 and jacking device 9. The jacking device connected by three tubes only to the hydraulic circuit, has a piston 19 carrying the lower mold platen 10 guided by guideways 11. In said lower mold platens there are grouped the suction, evacuation, the automatic supply of oil to the main piston as indicated by the controls devices 22, 23, 25, 26 provided for said jacking device. The upper mold platen 12 is also guided by suitable guideways. A pump driven by an electric motor 24 operates the piston through a suitable hydraulic circuit.

Above the upper platen is an injection pot 3 and above this is a pot carrier 14 which is fixed on the main slideway which itself slides on guides on the frame of the machine, and on the upper part there is fixed the hopper 15 for plastic material. An injection piston 6 enters the injection pot and is activated by a jack 5. Arrangements for heating the pot may be provided.

The general operation of the machine is as follows:

*Ascent*

(a) Rapid approach by an approach piston inside the main piston 19; the large piston automatically fills with oil by aspiration from the tank;

(b) High pressure oil is admitted to the injection piston 6.

*Desecnt*

(c) The main piston is made ready for withdrawal, as also the extraction jack 5 of the injection piston 6, and these stop at the cooling position;

(d) It continues in its descent—bottom dead point (ejection);

This general movement is controlled exclusively by one single hydraulic distributor 22, designed especially for this work (three electric valves mounted on its plate, ensuring its automatic running).

In this automatic operation, the external control lever operates alone. The control of this press can be manual, semi-automatic or automatic.

In the semi-automatic and automatic running, the control of the electric valves is effected through two time relays;

The stopping in the cooling and bottom dead point positions is effected by two hydraulic blocks housed in the gooseneck of the frame. In these two positions, the hydraulic pump runs idly.

The operation of the platens is effected by two oil intakes on the side of the jacking device 9; and a hydraulic device fixed on the side member of the group permits the automatic running thereof. The closure time is practically zero.

Electric circuit

The whole circuit is grouped in a pivoting control panel 16 which comprises temperature regulators 17, relays, time relays 18, circuit-breakers, control switches, etc. 18A.

Cooling circuit

A cooling control panel 20 contains the water circuits supplying the cooling water to the tank, the pot-carrier, the injection piston, and other parts.

Figure 2:
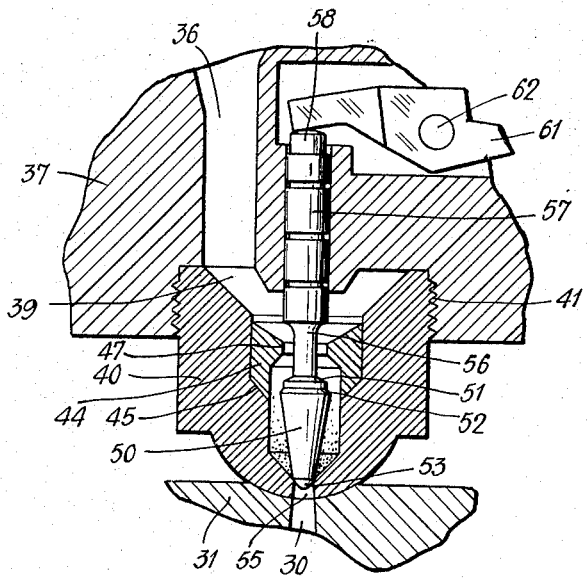
FIGURE 2 is a vertical sectional view of the injection nozzle and associated parts.

Referring now to FIGURES 2, 3 and 4, a two part mold 31, 33, provides a mold cavity 32 and injection inlet channel 30. The injection pot 3 receives material to be molded from a hopper section 34 and this material is forced down by injection piston 6 into one or more injection channels 35. Each channel leads through a continuation 36 in a channel number 37 to an injection pressure chamber 39 in an injection nozzle 40 which is detachably secured by screw-threads 41 to the member 37. Within the nozzle 40 is a nozzle chamber 42. The chambers 39, 42 are separated by a valve seating formed by a seating ring 44 which is removably placed in the nozzle so that it seats on an abutment surface 45 but can be removed through the chamber 39. The valve seating has a cylindrical part 47 and a frusto-conical part 48 in the chamber 42.

Within the chamber 42 is a valve member 50 which has an upper part 51 which can enter the cylindrical seating 47; a frusto-conical part 52 which can engage the seating 48; a large diameter part 54; and a tapered extension to a lower part 53 which can seat on the nozzle opening 55 to close the latter.

The valve member is connected by a valve stem 56 to a valve piston 57. The stem 56 is of smaller cross-sectional area than the piston and the piston is of smaller cross-sectional area that the large diameter part 54. The valve ring opening 47 may be of the same diameter as the piston and certainly larger than the stem 56. The lower end of the piston enters the chamber 39. The piston 57 has annular, peripheral or circumferential grooves 60 so that any liquid material which passes up the piston can pass around the grooves to equalize the pressure thereof radially on the piston to prevent cross-binding of the piston.

The piston slides in a bore or cylinder in the member 37 and its upper end 58 extends into an opening 59 which receives a lever 61 that is pivotally mounted on a pin 62. One end of this lever engages on the end 58 while the other end of the lever has one end of a tension spring 63 connected thereto. The other end of the spring is connected to a plunger 64 and this plunger has an opening 65 therein through which the lever 61 passes. This opening is of greater height than the lever and serves as a lost motion device. The plunger passes through a cylinder 66 which contains a heavier spring 67 which is in compression between an adjustable abutment 68 on the upper end of the plunger and an abutment 69 at the lower end of the cylinder 66 so that the spring 67 urges the plunger upwards.

In FIGURE 2 the parts are shown in the position between molding operations. The piston 6 is raised so that material from the hopper 34 enters the pot 3. The material is heated and becomes molten but cannot run out of the nozzle opening 55 as this is closed by the lower part 53 of the valve member 50, the valve member being held down by spring 63.

FIGURE 3 shows the position during molding. The piston presses the material in pot 3 and forces it through channels 35, 36 to the pressure chamber 39. The pressure rises in 36, 39, and nozzle chamber 42. The valve member ascends against the action of the spring 63 due to the pressure on the piston. The pressure is low, the spring 63 being of low rating. After an initial lost motion of the lever 61 in the opening 65 the lever engages an abutment 70 and commences to pull on the stronger spring 67. As the valve member 50 approaches the valve seating the chambers 39, 42 become progressively closed off from each other. The pressure in chamber 42 becomes stabilised and the pressure in 39 continues to rise as the mold cavtiy 32 becomes filled but the pressure in 42 does not increase further. The mold cavity is thus filled at the regulated pressure.

The pressure regulation is effected on the one hand by the spring 67 permitting a more economical operation in certain cases of molding, and on the other hand by an internal automatic regulation, due to the difference of the diameters of the valve piston and valve member 50. This is especially desirable for the universal type of press. In fact the press closure power during the molding is a function of the losses of pressure head. This power is thus variable according to the viscosity of the plastic material. Thus it is important to create an automatic regulation without the intervention of an external source of fixed power during molding. The difference of the diameters solves this problem and the regulation spring 67 exists only to permit a more economical operation. The valve is unbalanced by reason of the two different diameters or cross-sectional areas whereby it will continually be urged from the side with greater diameter, by a value equal to:

$$\left(\frac{\pi D^2}{4} - \frac{\pi d^2}{4}\right)P = \text{Force directed from the chamber 39 towards the chamber 42}$$

$D=$ larger diameter of the valve
$d=$ smaller diameter of the valve piston
$P=$ internal pressure in the injection pot.

The valve practically alone will effect the regulation of pressure.

In the chamber 42, a force opposed by a value equal to the above force at the end of molding $$\frac{\pi D^2}{4} \times P = \text{force directed towards the chamber 39 at the end of molding}$$

$P=$ pressure in the mold or in the chamber 42.

The regulation formula thus without any external source of power, spring, etc., becomes $$\frac{\pi D^2}{4} \times P = \left(\frac{\pi D^2}{4} - \frac{\pi d^2}{4}\right)P$$

$$P = \left(\frac{D^2 - d^2}{D^2}P\right)$$

In a practical example $$P' = \left(\frac{8.6^2 - 8^2}{8.6^2}\right)P$$

$$P' = \frac{74-64}{74} \times P = \frac{10}{74}P = 0.13P$$

Thus a ratio of 7.6.

The molding area in cavity 32 will be a maximum of 7.6 times greater than the area of the injection piston 6.

The supplementary external spring 67 diminishes this ratio for molding under more favorable conditions.

The two chambers 39 and 42 are separated simply by the valve seating ring 44 which can be rapidly removed and changed. The valve 50 can also be changed for changing the pressure regulation ratio.

The frusto-conical seating provides a final definite closure, despite wear on the larger diameter, especially for very mobile fluid materials (polyamide) etc.

The special designed tapered shape of the valve member 50 permits an absolutely correct flow of the plastic material.

FIGURE 4 shows the parts at the end of the molding operation when the valve member 50 has its parts 51, 52 seating on the valve seating and closing off the chamber 42 from chamber 39.

The chamber 42 is subjected to the regulated pressure against the force of the regulation spring 67.

We thus have two pressures:

$P$=pressure in the chamber 39
$p$=pressure in the chamber 42 and in the molding cavity 32.

Thus necessarily we have at the minimum the following equilibrium, in order to avoid the separation of the two parts of the mold 31 and 33:

Section of the molded cavity 32 multiplied by $p$=section of the injection piston 6 multiplied by $P$ In order to mold a piece five times larger than the injection piston 6, the pressure in 42 will be five times smaller than the pressure in 35, 36, 39.

Figure 5:
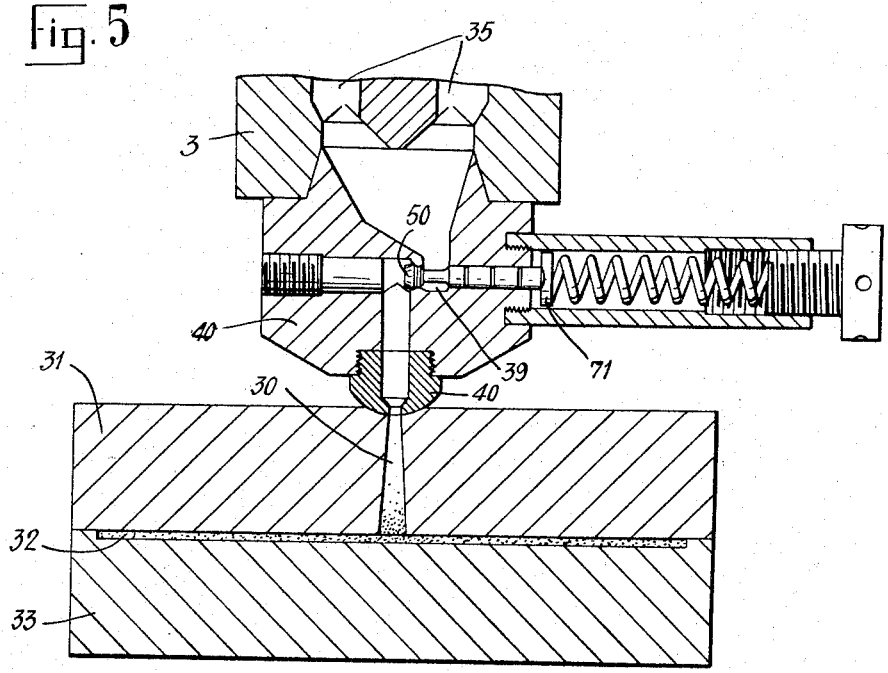
FIGURES 5 and 6 are similar views showing modified constructions.
Figure 14:
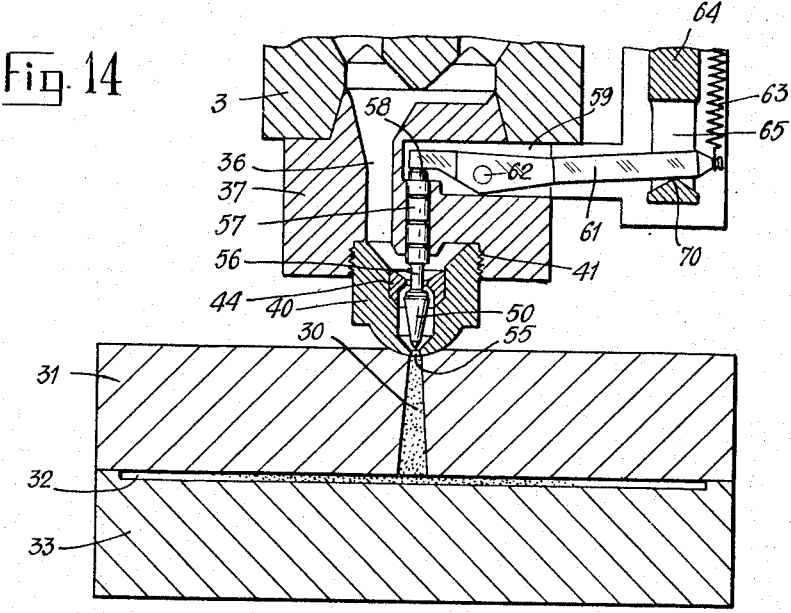

FIGURE 5 shows a modification in which the axis of the valve seating is transverse to the general direction of the flow of the plastic material. The valve piston in this case is horizontal and acted on directly by compression spring and pressure plate 71. The valve member 50 in this case does not close off directly at the nozzle opening.

Figure 6:
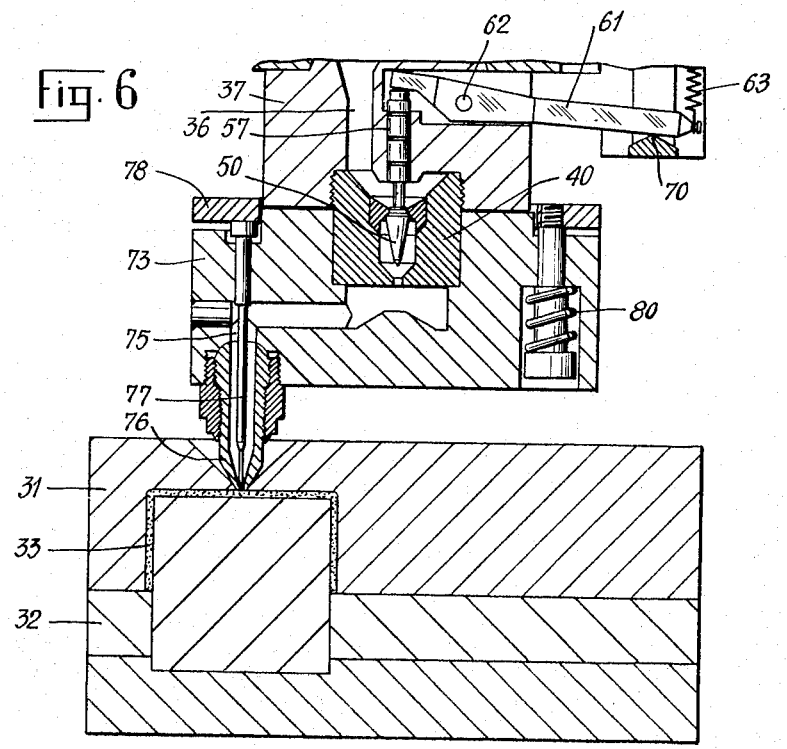

FIGURE 6 shows a modification in which the nozzle seats in a distributor block 73, the nozzle opening leads to a channel 74 which leads to one or more vertical injection channels 75 having a second injection nozzle 76 which can be closed by a valve member 77 which can be actuated by an external member 78. A spring 80 urges the block 73 on to the nozzle 40.

FIGURE 7 shows the valve of FIGURES 2 to 4 on a larger scale, and FIGURES 8 to 12 show the valve and other parts in different views.

As stated hereabove, each element contained in the machine which is the object of this invention has been created and designed specially (except the standard pump). The general characteristics of the unit of FIGURE 1 consist of: 0.90 m. x 1.50 m. in size. Height 2.30 m. Platens: 340 mm. x 420 mm. Stroke: 350 mm. Injection power 40 tons. Plunger: diameter 75, stroke in the pot: 70. Injection speed 60 ccs. per second. Injected weight 100 to 150 grammes. Hourly plastification: 12 to 18 kg., according to the dimensions of the injection pot. Heating: 3 to 5 kw. Motor: 10 hp. Number of cycles in one hour: 600 max.

After reading the foregoing detailed description of the illustrative and preferred embodiments of the instant invention presented in the annexed drawings, it should be apparent that the objects set forth have been successfully achieved. Various modifications, other than those specifically suggested may occur to those of ordinary skill in the art, and accordingly, I do not limit myself to such details except as required by the scope of the claims.

What is claimed is:

1. A pressure regulator for injection of a plastic material, comprising a nozzle having an injection passageway including an inlet and an outlet for connection to a mold cavity, valve means in said passageway disposed between said inlet and outlet, biasing means urging the valve means to open said inlet, and a face on said valve means subject to pressure of plastic material in said passageway which tends to move the valve means to close said inlet, whereby increase and decrease of pressure of the injection material respectively move said valve means to close and open said inlet thereby maintaining a constant rate of flow of plastic material through the passageway.

2. In a molding machine, apparatus as set forth in claim 1, wherein said valve means comprises a body having faces which are opposed conic surface portions having a common base.

3. In a molding machine, apparatus as set forth in claim 1, wherein said biasing means comprises a spring.

4. In a molding machine a regulating device, for regulating the flow of material under pressure to a mold, comprising an injection nozzle passageway having an inlet and an exit, a movable valve in said passageway and having opposed pressure faces presenting different pressure areas with the face having the larger pressure area toward the exit, said valve being alternatively movable to first and second positions respectively closing said exit and inlet and to intermediate positions leaving the said exit and inlet open, and biasing means urging said valve to said first position, whereby said valve body is movable to said second and intermediate positions by the difference of pressure of injection plastic material exercised on said opposed pressure faces in opposition to the force of said biasing means.

5. A molding machine pressure regulator comprising means providing first and second chambers communicating through an opening therebetween, a valve member including a head movable in said second chamber and a stem connected valve piston reciprocally movable in said first chamber, and a seating between said chambers for said valve head, said seating surrounding said opening, said valve head being movable from a first position spaced from said seating to a second position on said seating, the effective axial pressure face of said piston presented to said first chamber being smaller than the effective axial pressure face of said valve member presented to said second chamber, said second chamber having an outlet axially aligned with said seating and the path of movement of said valve member, and a resilient biasing means urging said valve member to close said outlet.

6. An injection molding machine having an injection nozzle chamber to be connected to the mold, a pressure chamber receiving material to be molded, a valve seat between said chambers, a valve member located in said nozzle chamber, a valve piston slidable in a cylinder adjacent said pressure chamber, one end of said piston communicating with said pressure chamber, a valve stem connecting the piston with the valve member, said stem having a smaller cross-sectional area than the piston and the piston having a smaller cross-sectional area than the valve member, said injection nozzle chamber having an outlet to the mold which is axially aligned with the path of movement of said valve member, said valve member being movable to close said outlet, said piston protruding outside said pressure chamber and cylinder, a pivoted lever bearing at one end against said piston, and resilient means biasing the other end of said lever to turn the lever and urge the valve member in a direction to close said outlet.

7. An injection molding machine as claimed in claim 6 wherein is further provided a tubular member having a shoulder and fixed to the outside of said pressure chamber, a member axially movable in said tubular member and having an external portion at one end, and a slot in said external portion of said movable member having a raised edge providing a fulcrum in one wall, said lever having a portion near said other end passing through said slot and resting on said fulcrum at a point spaced from its pivot, said resilient means including a spring on said shoulder bearing against and urging the movable member in one direction, and a second spring connected to said other end of the lever and said movable member to urge the lever away from said fulcrum within said slot.

8. An injection molding machine having an injection nozzle chamber to be connected to a mold, a pressure chamber receiving material to be molded, a valve seat between said chambers, a valve member located in said nozzle chamber, a valve piston slidable in a cylinder, one end of said piston communicating with said pressure chamber, a valve stem connecting the piston with the valve member, said stem having a smaller cross-sectional area than the piston and the piston having a smaller cross-sectional area than the valve member, said injection nozzle chamber having an outlet to the mold which is axially aligned with the path of movement of said valve member, said valve member being movable to close said outlet and biasing means urging said valve member away from said valve seat and toward said outlet.

9. A machine as claimed in claim 8 wherein the piston has one or more annular grooves in its exterior surface for equalizing pressure radially of the piston.

10. A machine as claimed in claim 8 wherein the end of the valve member remote from said valve seating is shaped to contact and close the nozzle opening leading to the mold and is held in closed position by biasing means between molding operations.

11. A machine as claimed in claim 10 wherein a lost motion device is interposed between the valve piston and the spring and a second resilient means acts on the valve member in the direction to urge it away from said valve seating after an initial movement of the valve member away from said nozzle opening.

12. A machine as claimed in claim 8 wherein the nozzle opening communicates with a distributor channel in a block, said channel leading to a further nozzle which communicates with the mold, said further nozzle having a closure valve operable by a member located outside the block and nozzles.

13. In a molding machine a regulating device, for regulating the flow of material under pressure to a mold, comprising a passageway having first and second communicating chambers therein, an inlet opening to the second chamber between said chambers and an exit opening from said second chamber, a movable valve body of varying diameter positioned in said second chamber and having opposed pressure faces thereon presenting different effective pressure areas with the face having the larger pressure area toward the exit opening, said valve body being alternatively movable to first and second positions respectively closing said exit and inlet openings and to intermediate positions leaving both said openings unclosed, and biasing means urging said valve body to said first position, whereby said valve body is movable to said second and intermediate positions by the difference of pressure of injection plastic material exercised on said opposed pressure faces in opposition to the force of said biasing means.

14. A molding machine pressure regulator comprising injection passage means providing first and second chambers, a valve member including a head movable in said second chamber and a stem connected valve piston reciprocally movable in said first chambers, a seating between said chambers for said valve head, an exit opening in said second chamber, said valve head being movable from a first position closing said exit opening to intermediate positions spaced from both said opening and said seating and to a second position on said seating, said head having a pressure surface which when engaged by plastic molding material urges the head toward said seating, said piston having a surface presented to said first chamber smaller than the said pressure surface of said head, and a biasing means urging said valve head toward the first position, said valve head and said seating being both removable to permit changing the pressure regulation ratio according to molding conditions.

15. In a molding machine having an injection chamber and a mold cavity, an injection passageway having opposed inlet and outlet openings for communicating respectively with said chamber and said mold cavity, a valve means movable in said passageway to positions alternately closing said openings and to positions intermediate said openings which define differing cross sectional areas of said passageway for flow of plastic molding material from one opening to the other, said valve means having a surface facing the outlet opening and a surface of smaller area facing the inlet opening, and biasing means urging said valve means toward closing engagement with said outlet opening, whereby plastic molding material entering the inlet opening of said passageway engages said surface of larger area to move the valve means to open the exit opening and retains said valve means in an intermediate position balanced by the pressure against the surface of smaller area combined with the pressure of said biasing means and, upon filling of a mold, back pressure created in said passageway increases the pressure on said surface of larger area to move the valve means into closing engagement with said inlet opening.

References Cited by the Examiner

UNITED STATES PATENTS

| 2,469,038 | 5/1949 | Winkler | 137—505.3 |
| 2,668,325 | 2/1954 | Goodwin | 18—30 |
| 2,892,214 | 6/1959 | McCarthy | 18—30 |
| 3,023,458 | 3/1962 | Seymour | 18—30 |

FOREIGN PATENTS

| 5,277 | 2/1891 | Great Britain. |
| 294,048 | 10/1915 | Germany. |
| 912,194 | 4/1946 | France. |
| 1,150,189 | 8/1957 | France. |

ALEXANDER H. BRODMERKEL, *Primary Examiner.*

MORRIS LIEBMAN, ROBERT F. WHITE, *Examiners.*